United States Patent [19]

Endo et al.

[11] Patent Number: 5,397,654
[45] Date of Patent: Mar. 14, 1995

[54] ABRASION-RESISTANT WELDED STEEL PIPE

[75] Inventors: Shigeru Endo; Moriyasu Nagae; Osamu Hirano; Kazuyoshi Ume, all of Kawasaki, Japan

[73] Assignee: NKK Corporation, Tokyo, Japan

[21] Appl. No.: 142,249

[22] Filed: Oct. 22, 1993

[30] Foreign Application Priority Data

Sep. 13, 1993 [JP] Japan ................................. 5-227087

[51] Int. Cl.6 ............................................. B32B 15/18
[52] U.S. Cl. .................................... 428/683; 138/171
[58] Field of Search ............... 428/684, 682, 683, 638; 138/171, 142

[56] References Cited

U.S. PATENT DOCUMENTS

| | | | |
|---|---|---|---|
| 3,674,577 | 7/1972 | Degenkolbe et al. | 428/683 |
| 4,091,147 | 5/1978 | Kanazawa et al. | 428/683 |
| 4,464,209 | 8/1984 | Taira et al. | 428/683 |
| 4,804,021 | 2/1989 | Hasegawa et al. | 138/171 |
| 5,116,571 | 5/1992 | Abe et al. | 420/110 |
| 5,181,974 | 1/1993 | Tanabe et al. | 138/171 |
| 5,272,305 | 12/1993 | Endo et al. | 219/61 |
| 5,300,751 | 4/1994 | Endo et al. | 219/61 |

FOREIGN PATENT DOCUMENTS

| | | | |
|---|---|---|---|
| 753036 | 2/1967 | Canada | 428/683 |
| 56-14127 | 4/1981 | Japan . | |
| 57-89426 | 6/1982 | Japan . | |
| 61-76615 | 4/1986 | Japan . | |
| 63-290616 | 11/1988 | Japan . | |
| 3-227233 | 10/1991 | Japan . | |
| 5-171264 | 7/1993 | Japan | 138/142 |

*Primary Examiner*—John Zimmerman
*Attorney, Agent, or Firm*—Frishauf, Holtz, Goodman & Woodward

[57] ABSTRACT

An abrasion-resistant welded steel pipe having a base plate and a weld metal: consists essentially of 0.05 to 0.2 wt. % C, 0.5 to 2 wt. % Si, 0.5 to 2.5 wt. % Mn, 0.02 to 2 wt. % Al, the balance being Fe and inevitable impurities; and the steel pipe has a Vickers hardness of at least 200. The abrasion-resistant welded steel pipe can further contain at least one element selected from the group consisting of 0.05 to 1 wt. % Cu, 0.05 to 2 wt. % Ni, 0.05 to 2 wt. % Cr, 0.05 to 1 wt. % Mo, 0.005 to 0.1 wt. % Nb, 0.005 to 0.1 wt. % V, 0.005 to 0.1 wt. % Ti, 0.0003 to 0.002 wt. % B.

41 Claims, 1 Drawing Sheet

ABRASION-RESISTANT WELDED STEEL PIPE

BACKGROUND OF THE INVENTION

1. Field of the Invention

The present invention relates to an abrasion-resistant welded steel pipe suitablly used in portions or parts of industrial machines, apparatus or devices related to mining, or transportation of slurry material such as ore slurry and coal slurry, the portions or parts receiving severe abrasion.

2. Description of the Related Arts

In general, an abrasion-resistant steel can be improved in its resistant property by increasing its surface hardness. For this reason, most of the prior art abraision-resistant steels have been produced by quenching steels containing a great quantity of alloy elements in addition to carbon. Such abrasion-resistant steels, however, have disadvantages in being poor in workability due to their high hardenability and in weldability due to their high carbon equivalent.

To overcome these disadvantages, several prior arts are disclosed in respect of abrasion-resistant steel plates. One is a method for producing abrasion-resistant steel plates, by hot-rolling steels having considerably low carbon equivalent and then, quenching the hot-rolled steel plates. This is disclosed in such publications as Japanese examined patent publication No. 56-14127, Japanese unexamined patent publication No. 57-89426 and Japanese patent unexamined Publication No. 61-76615. Those produced abrasion-resistant steel plates have a high Vickers hardness of 350 or more, due to the quenching treatment. This high hardness gives the high abrasion-resistant property to the hot-rolled plates. It is, however, well known that when the hardness is increased exclusively by such heat treatment, a zone heat-affected by welding is remarkably softened due to the heat produced at welding. When steel pipes are produced from steel plates by welding, the steel plates are formed into a cylindrical shape and then, a seam portion of both edges of the cylindrically formed plates are required to be welded. Therefore, when steel plates are used for production of welded steel pipes, it is expected that the heat-affected zone of the welded steel pipes are significantly softened and that the abrasion-resistant property of the heat-affected zone is deteriorated. In addition, these disclosed steel plates are expected to be poor in the workability and the weldability and they are difficult to use to produce abrasion-resistant welded steel pipes.

Further, an abrasion-resistant laminated steel plate comprising a steel sheet with high hardness and a steel sheet with low hardness is disclosed in Japanese unexamined patent publication No. 3-227233. The abrasion-resistant property of the laminated steel plate is procured by the steel sheet with high hardness located on the surface side and the weldability of the laminated steel plate is procured by the steel sheet with low hardness located on the lower side. The laminated steel plate, however, is disadvantageous in that the steel sheet with high hardness forming a hardened layer of the laminated steel plate is hard to use for a long period in an environment where the hardened layer is easy to be worn out since the hardened layer is thin in thickness and in that producing a steel pipe by welding the laminated steel plate is extremely difficult.

In Japanese unexamined patent publication No. 63-290616, a method for producing an abrasion-resistant steel pipe from a laminated steel plate, a steel sheet forming the hardened layer being made from an austenitic stainless steel or a martensitic stainless steel. This abrasion-resistant steel plate has also a problem in that the steel plate is costly because it contains 12 wt. % or more Cr, beside the already mentioned disadvantages peculiar to the laminated steel plate.

SUMMARY OF THE INVENTION

The object of the present invention is to provide an abrasion-resistant welded steel pipe which is excellent in weldability, workability and abrasion-resistant property, the abrasion-resistant property being procured in a base plate, a welded metal and a heat-affected zone of the welded steel pipe.

To attain the object, the present invention provides an abrasion-resistant welded steel pipe having a base plate and a weld metal: consisting essentially of 0.05 to 0.2 wt. % C, 0.5 to 2 wt. % Si, 0.5 to 2.5 wt. % Mn and 0.02 to 2 wt. % Al and the balance being Fe and inevitable impurities; and said steel pipe having a Vickers hardness of at least 200.

Further, the present invention provides another abrasion-resistant welded steel pipe having a base plate and a weld metal: consisting essentially of 0.05 to 0.2 wt. % C, 0.5 to 2 wt. % Si, 0.5 to 2.5 wt. % Mn, 0.02 to 2 wt. % Al, at least one element selected from the group consisting of 0.05 to 1 wt. % Cu, 0.05 to 2 wt. % Ni, 0.05 to 2 wt. % Cr, 0.05 to 1 wt. % Mo, 0.005 to 0.1 wt. % Nb, 0.005 to 0.1 wt. % V, 0.005 to 0.1 wt. % Ti, 0.0003 to 0.002 wt. % B, and the balance being Fe and inevitable impurities; and said steel pipe having a Vickers hardness of at least 200.

DESCRIPTION OF THE PREFERRED EMBODIMENT

Figure 1A:
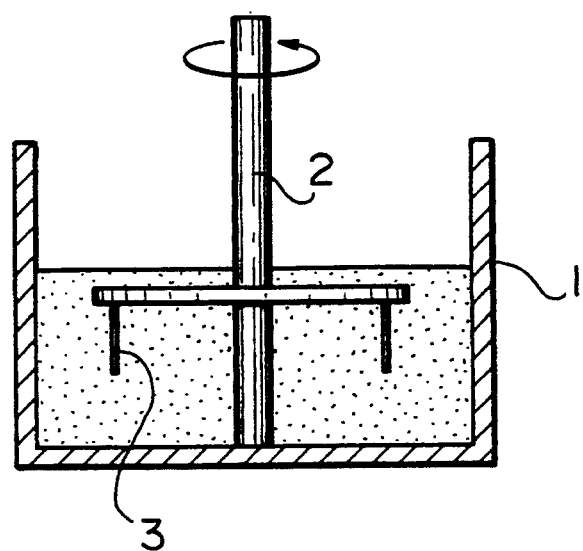
FIG. 1(A) is an elevation view, partly in cross-section which shows an abrasion-resistant property test apparatus used for evaluation.

In the present invention, carbon steel is a fundamental key for preparing steel for the present invention costlessly. Both of a base plate which is a base material used for a welded steel pipe and a weld metal which welds a seam joint portion of the welded steel pipe have appropriate chemical compositions which affect the abrasion-resistant property, weldability and workability. At the same time, the hardness of the base plate and the weld metal is to have a Vickers hardness of 200 or more. For improvement in the abrasion-resistant property, not only the increase in the hardness but also the formation of a metal texture which improves in the abrasion-resistant property are preferable.

Now the reasons for limiting content ranges of elements contained in abrasion-resistant steels used for the present invention will be described.

(1) C: 0.05 to 0.20 wt. %

C is indispensable for improving the abrasion-resistnt property by increasing an area fraction of martensite-austenite constituent and martensite. The lower limit of the C content is 0.05 wt. % since the effect of the improvement is small when the C content is less than 0.05 wt. %. The upper limit of the C content is 0.20 wt. % since the weldability is deteriorated when the C content is more than 0.20 wt. %. The C content ranges more preferably from 0.1 to 0.2 wt. %.

(2) Si: 0.50 to 2.00 wt. %

It is one of the features of the present invention that 0.50 to 2.00 wt. % Si in the steel is included more than the Si content of the prior art abrasion-resistant steel. That is to say, this increase in the Si content produces an amount of the martensite necessary for the improvement in the abrasion-resistant property. Thanks to the production of the necessary amount of martensite, an abrasion-resistant property substantially equal to that of the prior art abrasion-resistant steel is effected, in spite of the hardeness of the steel of the present invention being less than that of the prior art abrasion-resistant steel.

0.50 wt. % or more Si produces sufficiently martensite necessary for the improvement in the abrasion-resistant property and by this production, the satisfactory abrasion-resistant property is attained. But less than 0.50 wt. % Si is ineffective in the abrasion-resistant property. For this reason, the lower limit of the Si content is 0.50 wt. %. On the other hand, more than 2.00 wt. % Si causes deterioration of hot ductility and weldability of the steel plate and cracks of the welded metal. In this view, the upper limit of the Si content is 2.00 wt. %. It is noted that 1 wt. % or more Si is more preferable although the lower limit of the Si content is 0.50 wt. %.

(3) Mn: 0.50 to 2.50 wt. %

Mn is indispensable for increasing an amount of residual austenite or martensite. Less than 0.50 wt. % Mn shows a little the effect. More than 2.50 wt. % Mn invites deterioration of the weldability. The Mn content ranges from 0.50 to 2.50 wt, %. 1 to 2 wt. % Mn is more preferable.

(4) Al: 0.02 to 2.00 wt. %

Al has an effect similar to Si. Namely, 0.02 wt. % Al produces martensite necessary for the improvement in the abrasion-resistant property. Therefore, 0.02 wt. % or more Al content is indispensable. But, more than 0.02 wt. % Al adversely affects the hot ductility and the weldability of the steel plate. The upper limit of the Al content is 2.00 wt. %. In view of the improvement in the abrasion-resistant property, 0.50 to 2 wt. % Al is preferable. 1 to 2 wt. % Al is more preferable.

There are three types of preferable composition ranges defined by the combination of C, Si, Mn and Al content. The first one is 0.1 to 0.2 wt. % C; 1 to 2 wt. % Si; 1 to 2 wt. % Mn; and 0.02 to 0.05 wt. % Al. The Al content is lowered, but the C, Si and Mn contents, each are increased. In this respect, the abrasion-resistant property is improved. The second is 0.1 to 0.2 wt. % C; 0.5 to 2 wt. % Si; 1 to 2 wt. % Mn; and 0.02 to 2 wt. % Al. The C and Mn contents, each are increased and the abrasion-resistant property is improved. The third is 0.1 to 0.2 wt. % C; 0.5 to 2 wt. % Si; 1 to 2 wt. % Mn; and 1 to 2 wt. % Al. The C, Mn and Al contents, each are increased and the abrasion-resistant property is improved.

In addition to the above limitation of the indispensable elements, the reasons for limiting content ranges of elements optionally selected will be given.

(5) Optional Elements (Cu, Ni, Cr, Mo, Nb, V, Ti and B)

These elements are effective in the improvement in the abrasion-resistant property by increasing an amount of martensite-austenite constituent and martensite or increasing hardness of basic textures. For this improvement, at least one element selected from the group consisting of Cu, Ni, Cr, Mo, Nb, V, Ti and B can be added optionally to the steel within the ranges of the present invention, each given below.

Cu: 0.05 to 1.00 wt. %
Ni: 0.05 to 2.00 wt. %
Cr: 0.05 to 2.00 wt. %
Mo: 0.05 to 1.00 wt. %
Nb: 0.005 to 0.10 wt. %
V: 0.005 to 0.10 wt. %
Ti: 0.005 to 0.10 wt. %
B: 0.003 to 0.0020 wt. %

In respect of Cu, Ni, Cr, Mo, Nb and Ti, more preferable are 0.1 to 0.5 wt. % Cu; 0.1 to 0.5 wt. % Ni; 0.1 to 0.5 wt. % Cr; 0.05 to 0.3 wt. % Mo; 0.005 to 0.05 wt. % Nb; and 0.005 to 0.05 wt. % Ti. Further, in case that at least one element selected from the group consisting of 0.05 to 1.00 wt. % Cu, 0.05 to 2.00 wt. % Ni, 0.05 to 2.00 wt. % Cr, 0.05 to 1.00 wt. % Mo, 0.005 to 0.10 wt. % Nb, 0.005 to 0.10 wt. % V, 0.005 to 0.10 wt. % Ti and 0.0003 to 0.0020 wt. % B, there are also three types of preferable composition ranges defined by combination of C, Si, Mn and Al. The first one is 0.1 to 0.2 C; 1 to 2 wt. % Si; 1 to 2 wt. % Mn; and 0.02 to 0.05 wt. % Al. The second is 0.1 to 0.2 wt. % C; 0.5 to 2 wt. % Si; 1 to 2 wt. % Mn; and 0.02 to 2 wt. % Al. The third is 0.1 to 0.2 wt. % C; 0.5 to 2 wt. % Si; 1 to 2 wt. % Mn; and 1 to 2 wt. % Al.

(6) Hardness: 200 or more in terms of Vickers hardeness

Even if the steel has the compositions within the ranges specified in the present invention, the steel fails to attain the satisfactory abrasion-resistant property of 1.5 times or more hardness of that of JIB SS 400 steel when the hardness of the steel in the invention range is less than a Vickers hardness of 200. In this respect, the lower limit of the Vickers hardness is 200. Contrarily, the Vickers hardness of more than 350 causes the steel plate to be cracked when the steel plate is formed into a cylindrical shape, or causes the heat-affected zone of the cylindrically formed steel plate to be softened or cracked. The upper limit of the hardness is Vickers hardness of 350. The JIS SS 400 steel is defined to contain 0.050 wt. % or less P and 0.050 wt. % or less S and to have a tensile strength of 400 to 510 $N/mm^2$.

The means for having the steel have a Vickers hardness of 200 or more is not specifically limited. As the means, either the base plate for the welded steel pipe is heat-treated after the steel pipe is welded or the base plate is heat-treated before the steel pipe is welded. For the heat treatment, a method of heating the steel to a temperature between $Ac_3$ transformation point and $Ac_1$ transformation point and cooling the heated steel rapidly by such a cooling as water cooling is preferably employed. The steel plate is produced by hot rolling a slab having the compositions mentioned above.

The welded steel pipe is produced by the process in which the steel plate is formed into a cylindrical shape and a seam portion of both edges of the cylindrically formed steel plate is welded. The heat-affected zone of the welded seam portion is not found to be softened even if the welding is done after the heat treatment of the steel plate so long as the steel plate has the compositions of the present invention and the Vickers hardness of 200 to 350 is procured. In the heat treatment method of the steel pipe after the steel pipe is welded, the Vickers hardness of the heat-affected zone makes no difference from that of the base plate. In case that submerged arc welding or gas metal arc welding is employed, the chemical compositions of the base plate are different from those of the weld metal. Even in such a case, however, the Vickers hardness of 200 or more and a sufficient abrasion-resistant property are procured even in the state as being welded, so long as the chemical compositions of the base plate are within the ranges of the present invention. To say nothing of, even if the heat treatment is given after the welding of the steel pipe, satisfactory hardness and abrasion-resistant property is procured.

For the production of the welded bent steel pipe, a welded steel pipe having the compositions specified in the present invention is bent by hot working, and then, the heat treatment is applied to the welded steel pipe during the hot bending or after the hot bending. Alternatively, the welded steel pipe can be also bent by cold working.

EXAMPLE

In Table 1 the chemical compositions of the test pieces are shown. The weldability and the workability of the steel listed in Table 1 are equivalant to those of the steel used for a general structure. The cost of steel is also considered to be substantially be same with that of steel used for general structure. The steel plate was produced by hot rolling of the steel with the compositions of Table 1 and the steel plate was formed into a cylindrical shape. The seam joint of both edges of the cylindrically formed steel plate were welded by submerged arc welding or electric resistance welding to produce the welded steel pipe. The heat treatment was applied to the steel plate as the base plate before the steel pipe had been welded or to the welded steel pipe during the process where the steel pipe was being welded, as the case may be required. The heat treatment was done at a temperature between $Ac_3$ transformation point and $Ac_1$ transformation point and thereafter the rapid water cooling was done. The chemical compositions of the weld metal formed for the welded steel pipe are listed in Table 2. In Table 2, SMG means submerged arc welding and ERW electric resistance welding, respectively.

The welded steel pipe was evaluated by the Vickers hardness and the abrasion-resistant property. For the abrasion-resistant property an abrasion loss test was performed by rotating the test pieces in the environment where water and quartz sand are mixed. The evaluation of the abrasion-resistant property was done, using a value obtained by dividing an abrasion loss of each of the abrasion test pieces with an abrasion loss of JIS SS 400 steel test piece, and the value is called an abrasion loss ratio. The smaller the abrasion loss ratio is, the more excellent the abrasion-resistant property is.

Figure 1B:
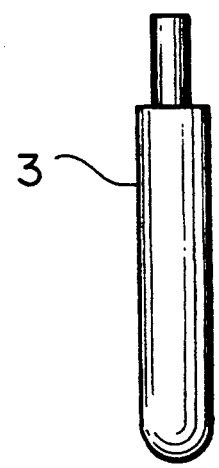
FIG. 1(B) is an elevation view which shows a test piece used for the abrasion-resistant property test.

A schematic picture of the test apparatus is sectionally given in FIG. 1(A). The test bath 1 is filled up with the mixed solution of water and quartz sand. The abrasion test piece 3 is set on the appratus with a 150 mm distance from the rotary shaft 2. The abrasion is produced by rotating the abrasion test piece amid the mixed solution. FIG. 1(B) shows the dimension of the abrasion test piece, the diameter of the test piece being 10 mm and the length being 60 mm. The test pieces of the base plate and the welded steel pipe, each were prepared by taking out a round bar from the center thick portion of the welded steel pipe. The heat-affected zone was reproduced in a manner in which the heat history at the welding is given by means of a heat reproduction cycle transfer, to each of the round bars taken out from the base plate. This test piece represents the metal texture of the actual heat-affected zone. The abrasion test was applied to the test piece.

In Table 3, the hardness and the abrasion-resistant property of the base plate, the heat-affected zone and the weld metal are shown. Those which satisfy the chemical compositions specified in the present invention are given the mark "◯", otherwise, the mark "X". The explanation about Table 3 will be described.

Example 1

The Example 1 shows the results of the welded steel pipes, using the heat-treated steel plates. This Example 1 includes controllers which are not the present invention and one of the controllers (Pipe A-2S) is a welded steel pipe having no heat treatment either in its base plate or the welded steel pipe, itself.

As shown in the columns of the Example 1, the chemical compositions of the base plates and the welded steel pipes are in the range of the present invention and the welded steel pipes having the Vickers hardness of 200 or more had good abrasion loss ratios of 0.7 or less. On the other hand, the controllers which are not according to the present invention had unsatisfactory abrasion loss ratios of 0.8 or more. For example, the controllers (Pipes R-IS, S-IS and T-IS) were not satisfactory in the abrasion-resistant property, even though they had a Vickers hardness of 200 or more. Further, the abrasion loss ratio of the pipe is 0.8 or more if the the pipe (Pipe A-2S) has a Vickers hardeness of less than 200. Regarding Pipe R-2S, since the abrasion-resistant property of its weld metal is exclusively in the composition range of the present invention, it has a good abrasion-resistant property of the weld metal, but its base plate and heat-affected zone which are not in the composition ranges of the present invention and had an unsatisfactory abrasion-resistant property.

Example 2

The Example 2 shows the results for the welded steel pipes. The steel pipe was produced from hot-rolled steel plate. The steel pipe including the weld metal was heat-treated. The welded steel pipes which are according to the present invention had good abrasion resistant properties. But Pipe Q-IS which is not in the composition range of the present invention had an unsatisfactory abrasion-resistant property of 0.8 or more.

Example 3

The Example 3 shows results of the bent welded steel pipes. Pipe B-IS is a weld steel bent pipe produced as follows.

A pipe shape was firstly formed from a steel plate having not been heat-treated, the shaped pipe being welded and the welded steel pipe being bent by bending while the welded steel pipe was heated by high frequency heating, and the bent welded steel pipe was produced. During the bend working, water cooling to the heat treatment was simultaneously applied. Pipe N-IS is a bent welded steel pipe produced as follows. A pipe shape was firstly formed from a steel plate having been heat-treated, the pipe shape being welded, The welded steel pipe was bent by cold working. Both of the bent welded steel pipes are in accordance with the present invention and the excellent abrasion-resistant property of both of them are seen from the results in Table 3.

From the foregoing, by having the chemical compositions and the Vickers hardness of the base plates and the weld metals controlled to be in the ranges of the present invention, the present invention can economically provide welded steel pipes and welded bent steel pipes having an excellent abrasion-resistant property of not only the base plates but also the weld metals and the heat-affected zones.

TABLE 1

| Steel | C | Si | Mn | Al | Cu | Ni | Cr | Mo | Nb | V | Ti | B | (wt. %) Remarks |
|---|---|---|---|---|---|---|---|---|---|---|---|---|---|
| A | 0.15 | 0.60 | 2.50 | 0.50 | — | — | — | — | — | — | — | — | Invention |
| B | 0.05 | 2.00 | 2.00 | 0.03 | — | — | — | — | — | — | — | — | Invention |
| C | 0.20 | 1.54 | 0.54 | 0.04 | — | — | — | — | — | — | — | — | Invention |
| D | 0.19 | 1.02 | 2.50 | 0.03 | 0.88 | — | — | — | — | — | — | — | Invention |
| E | 0.14 | 0.52 | 1.51 | 1.52 | — | 1.80 | — | — | — | — | — | — | Invention |
| F | 0.15 | 0.88 | 1.48 | 1.51 | — | — | 0.48 | — | — | — | — | — | Invention |
| G | 0.12 | 1.59 | 1.47 | 0.05 | — | — | — | 0.52 | — | — | — | — | Invention |
| H | 0.14 | 1.02 | 1.54 | 0.52 | — | — | — | — | 0.05 | — | — | — | Invention |
| I | 0.15 | 1.50 | 1.00 | 0.04 | — | — | — | — | — | 0.04 | — | — | Invention |
| J | 0.14 | 0.88 | 1.51 | 1.53 | — | — | — | — | — | — | 0.07 | — | Invention |
| K | 0.15 | 1.90 | 1.43 | 0.06 | — | — | — | — | — | — | — | 0.0010 | Invention |
| L | 0.14 | 0.54 | 1.35 | 0.04 | 0.32 | 0.26 | — | — | — | — | — | — | Invention |
| M | 0.12 | 0.88 | 1.38 | 0.06 | — | — | 0.48 | — | 0.08 | — | — | — | Invention |
| N | 0.11 | 0.53 | 1.56 | 0.02 | — | — | — | 0.16 | 0.01 | — | — | — | Invention |
| O | 0.15 | 0.56 | 1.52 | 0.60 | 0.31 | 0.21 | — | — | 0.03 | — | — | — | Invention |
| P | 0.11 | 0.92 | 1.27 | 0.08 | — | — | — | 0.08 | 0.07 | 0.02 | — | — | Invention |
| Q | 0.03 | 0.62 | 1.52 | 1.51 | — | — | — | — | — | — | — | — | Controller |
| R | 0.14 | — | 1.51 | 0.01 | — | — | — | — | — | — | — | — | Controller |
| S | 0.15 | — | 0.48 | 1.54 | — | — | — | — | — | — | — | — | Controller |
| T | 0.16 | 1.56 | 0.36 | 0.60 | — | — | — | 0.43 | — | — | — | — | Controller |
| U | 0.15 | 0.56 | 0.45 | 0.01 | — | — | — | — | — | — | 0.03 | — | Controller |

TABLE 2

| Steel | Pipe | C | Si | Mn | Al | Cu | Ni | Cr | Mo | Nb | V | Ti | B | Remarks |
|---|---|---|---|---|---|---|---|---|---|---|---|---|---|---|
| A | A-1S | 0.12 | 0.88 | 2.05 | 0.20 | — | — | — | — | — | — | — | — | Invention |
| A | A-2S | 0.12 | 0.45 | 2.33 | 0.35 | — | — | — | — | — | — | — | — | Controller |
| B | B-1S | 0.07 | 1.66 | 1.85 | 0.03 | — | — | — | — | — | — | — | — | Invention |
| C | C-1E | | | | | | (ERW) | | | | | | | Invention |
| D | D-1S | 0.14 | 0.88 | 2.35 | 0.03 | 0.58 | — | — | — | — | — | — | — | Invention |
| E | E-1S | 0.14 | 0.62 | 1.41 | 1.32 | — | 1.43 | — | — | — | — | — | — | Invention |
| F | F-1S | 0.15 | 0.68 | 1.55 | 1.23 | — | — | 0.41 | — | — | — | — | — | Invention |
| G | G-1S | 0.09 | 1.39 | 1.49 | 0.05 | — | — | — | 0.39 | — | — | — | — | Invention |
| H | H-1E | | | | | | (ERW) | | | | | | | Invention |
| I | I-1S | 0.15 | 1.24 | 1.21 | 0.04 | — | — | — | — | — | 0.02 | — | — | Invention |
| J | J-1S | 0.12 | 0.89 | 1.55 | 1.25 | — | — | — | — | — | — | 0.04 | — | Invention |
| K | K-1S | 0.15 | 1.40 | 1.46 | 0.06 | — | — | — | — | — | — | — | 0.002 | Invention |
| L | L-1S | 0.12 | 0.54 | 1.45 | 0.04 | 0.22 | 0.16 | — | — | — | — | — | — | Invention |
| M | M-1E | | | | | | (ERW) | | | | | | | Invention |
| N | N-1S | 0.11 | 0.56 | 1.56 | 0.02 | — | — | — | 0.12 | 0.01 | — | — | — | Invention |
| O | O-1S | 0.13 | 0.56 | 1.50 | 0.40 | 0.22 | 0.14 | — | — | 0.02 | — | — | — | Invention |
| P | P-1S | 0.11 | 0.72 | 1.37 | 0.05 | — | — | — | 0.08 | 0.05 | 0.02 | — | — | Invention |
| Q | Q-1S | 0.04 | 0.65 | 1.55 | 1.31 | — | — | — | — | — | — | — | — | Controller |
| R | R-1S | 0.12 | 0.32 | 1.45 | 0.01 | — | — | — | — | — | — | — | — | Controller |
| R | R-2S | 0.11 | 0.55 | 1.46 | 0.03 | — | — | — | — | — | — | — | — | Controller |
| S | S-1S | 0.11 | — | 0.48 | 1.54 | — | — | — | — | — | — | — | — | Controller |
| T | T-1S | 0.16 | 1.56 | 0.36 | 0.60 | — | — | — | 0.43 | — | — | — | — | Controller |
| U | U-1E | | | | | | (ERW) | | | | | | | Controller |

TABLE 3

| | Steel | Pipe | Welding Method | Chemical Composition Base Plate | Chemical Composition Weld Metal | Vickers Hardness Base Plate | Vickers Hardness Heat Affected Zone | Vickers Hardness Weld Metal | Abrasion Loss Ratio Base Plate | Abrasion Loss Ratio Heat Affected Zone | Abrasion Loss Ratio Weld Metal | Remarks |
|---|---|---|---|---|---|---|---|---|---|---|---|---|
| Example 1 | A | A-1S | SAW | ○ | ○ | 280 | 250 | 230 | 0.4 | 0.5 | 0.6 | Invention |
| | A | A-2S | SAW | ○ | x | 190 | 250 | 190 | 0.8 | 0.5 | 0.9 | Controller |
| | C | C-1E | ERW | ○ | — | 270 | 240 | — | 0.4 | 0.5 | — | Invention |
| | I | I-1S | SAW | ○ | ○ | 240 | 220 | 230 | 0.5 | 0.6 | 0.5 | Invention |
| | K | K-1S | SAW | ○ | ○ | 280 | 260 | 260 | 0.4 | 0.5 | 0.5 | Invention |
| | L | L-1S | SAW | ○ | ○ | 240 | 220 | 230 | 0.5 | 0.6 | 0.6 | Invention |
| | M | M-1E | ERW | ○ | — | 240 | 220 | — | 0.5 | 0.6 | — | Invention |
| | O | O-1S | SAW | ○ | ○ | 220 | 200 | 220 | 0.6 | 0.6 | 0.6 | Invention |
| | P | P-1S | SAW | ○ | ○ | 240 | 220 | 230 | 0.5 | 0.6 | 0.5 | Invention |
| | R | R-1S | SAW | x | x | 240 | 180 | 200 | 0.8 | 0.9 | 0.9 | Controller |
| | R | R-2S | SAW | x | x | 180 | 180 | 220 | 0.9 | 0.9 | 0.6 | Controller |
| | S | S-1S | SAW | x | x | 210 | 170 | 210 | 0.9 | 1.0 | 0.9 | Controller |
| | T | T-1S | SAW | x | x | 220 | 190 | 190 | 0.9 | 0.9 | 0.8 | Controller |
| | U | U-1E | ERW | x | — | 180 | 180 | — | 0.9 | 0.9 | — | Controller |
| Example 2 | D | D-1S | SAW | ○ | ○ | 280 | 270 | 240 | 0.4 | 0.4 | 0.5 | Invention |
| | E | E-1S | SAW | ○ | ○ | 260 | 270 | 250 | 0.5 | 0.5 | 0.5 | Invention |

TABLE 3-continued

|  | Steel | Pipe | Welding Method | Chemical Composition | | Vickers Hardness | | | Abrasion Loss Ratio | | | Remarks |
|---|---|---|---|---|---|---|---|---|---|---|---|---|
|  |  |  |  | Base Plate | Weld Metal | Base Plate | Heat Affected Zone | Weld Metal | Base Plate | Heat Affected Zone | Weld Metal |  |
|  | F | F-1S | SAW | o | o | 280 | 260 | 240 | 0.4 | 0.4 | 0.5 | Invention |
|  | G | G-1S | SAW | o | o | 270 | 260 | 240 | 0.4 | 0.5 | 0.5 | Invention |
|  | H | H-1E | ERW | o | — | 260 | 260 | — | 0.5 | 0.5 | — | Invention |
|  | J | J-1S | SAW | o | o | 250 | 250 | 240 | 0.6 | 0.6 | 0.6 | Invention |
|  | Q | Q-1S | SAW | x | x | 190 | 180 | 180 | 0.9 | 0.9 | 0.9 | Controller |
| Example 3 | B | B-1S | SAW | o | o | 200 | 220 | 210 | 0.6 | 0.6 | 0.6 | Invention |
|  | N | N-1S | SAW | o | o | 240 | 230 | 240 | 0.5 | 0.5 | 0.5 | Invention |

What is claimed is:

1. An abrasion-resistant welded steel pipe having a base plate and a weld metal which welds a seam joint portion of the welded steel pipe, the base plate and the weld metal both consist essentially of 0.05 to 0.2 wt. % C, 1 to 2 wt. % Si, 0.5 to 2.5 wt. % Mn, 0.02 to 2 wt. % Al and the balance being Fe and inevitable impurities; and said steel pipe having a Vickers hardness of at least 200.

2. The welded steel pipe of claim 1, wherein the C content is from 0.1 to 0.2 wt. %.

3. The welded steel pipe of claim 1, wherein the Mn content is from 1 to 2 wt. %.

4. The welded steel pipe of claim 1, wherein the Al content is from 0.5 to 2 wt. %.

5. The welded steel pipe of claim 4, wherein the Al content is from 1 to 2 wt. %.

6. The welded steel pipe of claim 1, wherein
the C content is from 0.1 to 0.2 wt. %;
the Si content is from 1 to 2 wt. %;
the Mn content is from 1 to 2 wt. %; and
the Al content is from 0.02 to 0.05 wt. %.

7. The welded steel pipe of claim 1, wherein
the C content is from 0.1 to 0.2 wt. %; and
the Mn content is from 1 to 2 wt. %.

8. The welded steel pipe of claim 1, wherein
the C content is from 0.1 to 0.2 wt. %;
the Mn content is from 1 to 2 wt. %;
the Al content is from 1 to 2 wt. %.

9. The welded steel pipe of claim 1, wherein the Vickers hardness is from 200 to 350.

10. The welded steel pipe of claim 1, wherein the welded steel pipe is a bent welded steel pipe.

11. An abrasion-resistant welded steel pipe having a base plate and a weld metal which welds a seam joint portion of the welded steel pipe, the base plate and the weld metal both consist essentially of 0.05 to 0.2 wt. % C, 1 to 2 wt. % Si, 0.5 to 2.5 wt. % Mn, 0.02 to 2 wt. % Al, at least one element selected from the group consisting of 0.05 to 1 wt. % Cu, 0.05 to 2 wt. % Ni, 0.05 to 2 wt. % Cr, 0.05 to 1 wt. % Mo, 0.005 to 0.1 wt. % Nb, 0.005 to 0.1 wt. % V, 0.005 to 0.1 wt. % Ti and 0.0003 to 0.002 wt. % B, and the balance being Fe and inevitable impurities; and said steel pipe having a Vickers hardness of at least 200.

12. The welded steel pipe of claim 11, wherein the C content is from 0.1 to 0.2 wt. %.

13. The welded steel pipe of claim 11, wherein the Mn content is from 1 to 2 wt. %.

14. The welded steel pipe of claim 11, wherein the Al content is from 0.5 to 2 wt. %.

15. The welded steel pipe of claim 14, wherein the Al content is from 1 to 2 wt. %.

16. The welded steel pipe of claim 11, wherein
the C content is from 0.1 to 0.2 wt. %;
the Mn content is from 1 to 2 wt. %; and
the Al content is from 0.02 to 0.05 wt. %.

17. The welded steel pipe of claim 11, wherein
the C content is from 0.1 to 0.2 wt. %; and
the Mn content is from 1 to 2 wt. %.

18. The welded steel pipe of claim 11, wherein
the C content is from 0.1 to 0.2 wt. %;
the Mn content is from 1 to 2 wt. %; and
the Al content is from 1 to 2 wt. %.

19. The welded steel pipe of claim 11, wherein the Vickers hardness is from 200 to 350.

20. The welded steel pipe of claim 11, which consists essentially of 0.1 to 0.2 wt. % C, 1 to 2 wt. % Si, 1 to 2 wt. % Mn, 0.02 to 0.05 wt. % Al, and at least one element selected from the group consisting of 0.1 to 0.5 wt. % Cu, 0.1 to 0.5 wt. % Ni, 0.1 to 0.5 wt. % Cr, 0.05 to 0.3 wt. % Mo, 0.005 to 0.05 wt. % Nb and 0.005 to 0.05 wt. % Ti.

21. The welded steel pipe of claim 20, wherein the Vicker hardness is from 200 to 350.

22. The welded steel pipe of claim 11, wherein the welded steel pipe is a bent welded steel pipe.

23. An abrasion-resistant welded steel pipe having a base plate and a weld metal which welds a seam joint portion of the welded steel pipe, the base plate and the weld metal both consisting essentially of 0.05 to 0.2 wt. % C, 0.5 to 2 wt. % Si, 0.5 to 2.5 wt. % Mn, 0.5 to 2 wt. % Al and the balance being Fe and inevitable impurities; and said steel pipe having a Vickers hardness of at least 200.

24. The welded steel pipe of claim 23, wherein the C content is from 0.1 to 0.2 wt. %.

25. The welded steel pipe of claim 23, wherein the Si content is from 1 to 2 wt. %.

26. The welded steel pipe of claim 23, wherein the Mn content is from 1 to 2 wt. %.

27. The welded steel pipe of claim 23, wherein the Al content is from 1 to 2 wt. %.

28. The welded steel pipe of claim 23, wherein the C content is from 0.1 to 0.2 wt. %; and the Mn content is from 1 to 2 wt. %.

29. The welded steel pipe of claim 28, wherein the Al content is from 1 to 2 wt. %.

30. The welded steel pipe of claim 23, wherein the Vickers hardness is from 200 to 350.

31. The welded steel pipe of claim 23, wherein the welded steel pipe is a bent welded steel pipe.

32. An abrasion-resistant welded steel pipe having a base plate and a weld metal which welds a seam joint portion of the welded steel pipe, the base plate and the weld metal consisting essentially of 0.05 to 0.2 wt. % C, 0.5 to 2 wt. % Si, 0.5 to 2.5 wt. % Mn, 0.5 to 2 wt. % Al, at least one element selected from the group consisting of 0.05 to 1 wt. % Cu, 0.05 to 2 wt. % Ni, 0.05 to 2 wt. % Cr, 0.05 to 1 wt. % Mo, 0.005 to 0.1 wt. % Nb, 0.005 to 0.1 wt. % V, 0.005 to 0.1 wt. % Ti and 0.0003 to 0.002 wt. % B, and the balance being Fe and inevitable impurities; and said steel pipe having a Vickers hardness of at least 200.

33. The welded steel pipe of claim 32, which consists essentially of 0.1 to 0.2 wt. % C, 0.5 to 2 wt. % Si, 1 to 2 wt. % Mn, 1 to 2 wt. % Al, and at least one element selected from the group consisting of 0.1 to 0.5 wt. % Cu, 0.1 to 0.5 wt. % Ni, 0.1 to 0.5 wt. % Cr, 0.05 to 0.3 wt. % Mo, 0.005 to 0.05 wt. % Nb and 0.005 to 0.05 wt. % Ti.

34. The welded steel pipe of claim 32, wherein the C content is from 0.1 to 0.2 wt. %.

35. The welded steel pipe of claim 32, wherein the Mn content is from 1 to 2 wt. %.

36. The welded steel pipe of claim 32, wherein the Al content is from 1 to 2 wt. %.

37. The welded steel pipe of claim 32, wherein the C content is from 0.1 to 0.2 wt. %; the Si content is from 1 to 2 wt. %; and the Mn content is from 1 to 2 wt. %.

38. The welded steel pipe of claim 32, wherein the C content is from 0.1 to 0.2 wt. %; and the Mn content is from 1 to 2 wt. %.

39. The welded steel pipe of claim 32, wherein the C content is from 0.1 to 0.2 wt. %; the Mn content is from 1 to 2 wt. %; and the Al content is form 1 to 2 wt. %.

40. The welded steel pipe of claim 32, wherein the Vickers hardness is from 200 to 350.

41. The welded steel pipe of claim 32, wherein the welded steel pipe is a bent welded steel pipe.

* * * * *